United States Patent [19]

Bishai

[11] Patent Number: 5,385,389
[45] Date of Patent: Jan. 31, 1995

[54] ADJUSTABLE VEHICLE SEAT
[75] Inventor: Macram N. Bishai, Weston, Mass.
[73] Assignee: McCord Win Textron, Winchester, Mass.
[21] Appl. No.: 173,218
[22] Filed: Dec. 27, 1993

Related U.S. Application Data

[63] Continuation of Ser. No. 36,973, Mar. 25, 1993, Pat. No. 5,316,371.

[51] Int. Cl.⁶ .............................................. B60N 2/02
[52] U.S. Cl. .............................. 297/339; 297/452.63; 297/284.1
[58] Field of Search .................. 297/338, 339, 284.1, 297/284.2, 284.3, 452.21, 452.63

[56]  References Cited

U.S. PATENT DOCUMENTS

| | | | |
|---|---|---|---|
| 3,241,879 | 3/1966 | Castello et al. | 297/460 |
| 3,273,877 | 9/1966 | Geller et al. | 297/284 |
| 3,550,953 | 12/1970 | Neale | 297/338 |
| 4,155,592 | 5/1979 | Tsuda et al. | 297/284 |
| 4,616,874 | 10/1986 | Pietsch et al. | 297/338 |
| 4,630,865 | 12/1986 | Ahs | 297/284 |
| 5,022,709 | 6/1991 | Marchino | 297/284 |
| 5,026,116 | 6/1991 | Dal Monte | 297/284 |
| 5,092,654 | 3/1992 | Inaba et al. | 297/284 |

Primary Examiner—Peter R. Brown
Assistant Examiner—Milton Nelson, Jr.
Attorney, Agent, or Firm—Reising, Ethington, Barnard, Perry & Milton

[57]  ABSTRACT

An adjustable automotive vehicle seat is equipped with a height adjust mechanism that includes a U-shaped frame having laterally spaced side members and a round front cross member that is mounted on the front ends of the side members for rotation about its centerline. A plurality of bow shaped leaf springs are spaced across the width of the seat with their front ends secured to the round front cross member. The rear ends of the leaf springs are secured to a slidable rear cross member. An electrically powered, reversible ball screw actuator translates the rear cross member in the longitudinal direction so that the height of the seat is adjusted by adjusting the curvature of the bow shaped leaf springs.

6 Claims, 1 Drawing Sheet

ADJUSTABLE VEHICLE SEAT

This is a continuation of copending application Ser. No. 08/036,973 filed on Mar. 25, 1993, now U.S. Pat. No. 5,316,371.

BACKGROUND OF THE INVENTION

This invention relates generally to seats for automotive vehicles and more particularly to automotive vehicle seats that are adjustable.

Automotive vehicles customarily have adjustable front seats or at least a driver's seat that is adjustable. Present systems include mechanical systems in which the seat is mounted on rails so that it slides fore and aft to adjust the longitudinal position of the seat in the vehicle. The rails can and usually are inclined so that the height of the seat adjusts in relation to the longitudinal position of the seat in the vehicle. This system is relatively simple in construction and inexpensive to manufacture. However, the height of the seat cannot be adjusted independently of the longitudinal position of the seat. Consequently, this system does meet the particular needs of many seat occupants.

Present systems also include six way power seats, an electro-mechanical system in which the longitudinal position, tilt and height of the seat are each independently adjustable to suit the particular needs of the seat occupant. These systems, however, are quite complicated and relatively expensive to manufacture because they involve complicated linkages to effect the height adjustment.

SUMMARY OF THE INVENTION

The object of this invention is to provide an adjustable automotive vehicle seat that has a height adjustment mechanism that is simple in construction, relatively inexpensive to manufacture and capable of adjusting the height of the seat independently of any other seat adjustments that are associated with the seat.

A feature of the invention is that the adjustable automotive vehicle seat has a height adjustment mechanism that changes the curvature of bow shaped leaf springs to effect the height adjustment.

Another feature of the invention is that the adjustable automotive vehicle seat has a height adjustment that simply changes the height of the seating surface to effect the height adjustment without any need for raising or lowering the seat frame.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
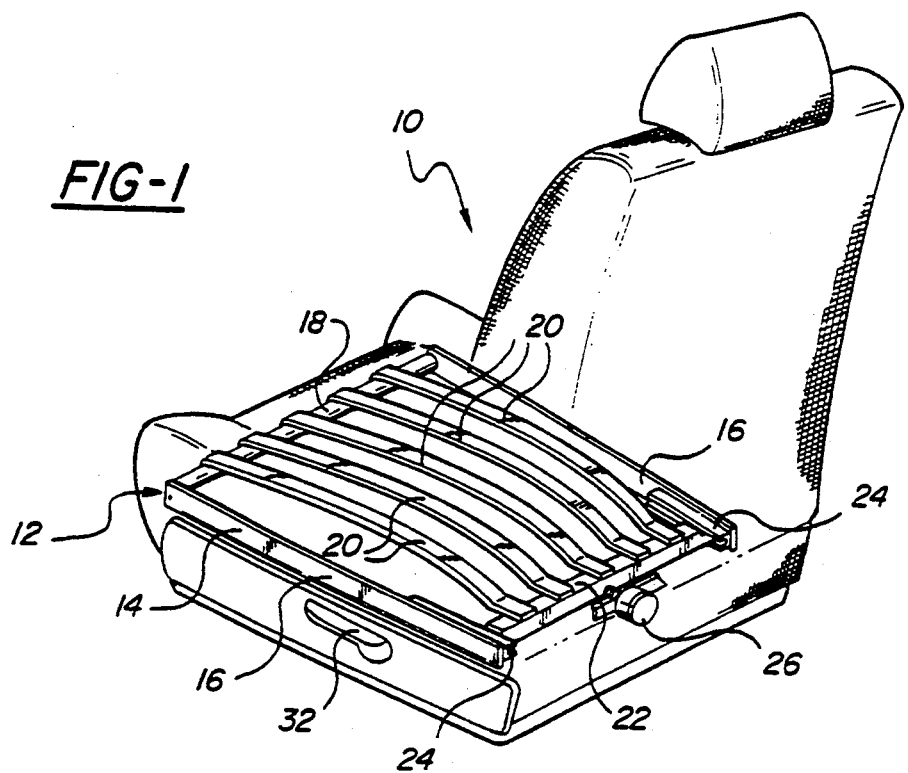
FIG. 1 is a perspective view of an adjustable automotive vehicle seat that is equipped with a height adjust mechanism in accordance with this invention.

Referring now to the drawing, an adjustable automotive vehicle seat indicated generally at 10 is equipped with a height adjust mechanism of this invention that is indicated generally at 12.

The height adjustment mechanism 12 comprises a U-shaped frame 14 that can be part of the frame for the seat or a separate frame. The frame 14 comprises laterally spaced side members 16 and a front cross member 18. The side members are fixed with respect to the vehicle seat 10. The longitudinal position of the front cross member is also fixed with respect to the vehicle seat 10. However, the front cross member 18 is preferably round and it is preferably mounted on the front ends of the side members 16 for rotation about its centerline as indicated by the double headed arrow in FIG. 2.

The height adjustment mechanism 12 further includes a plurality of bow shaped leaf springs 20 that are spaced across the width of the seat 10 and a rear cross member 22 that translates with respect to the frame 14 and may be guided in longitudinal tracks 24 in the rear ends of the side members 16. The rear cross member 22 may be in the shape of a flat bar so that it slides in longitudinal guide tracks 24 easily.

The front ends of the leaf springs 20 are curled and secured to the round front cross member 18 by any suitable means such as welding. The rear ends of the leaf springs 20 are in the form of flat tabs that are secured to the cross bar 22 by welding or other suitable means.

The height adjustment mechanism 12 also includes an electrically powered, reversible ball screw actuator 26 to translate the cross bar 22 in the longitudinal direction. The housing of the ball screw actuator 26 is secured to a lateral frame member 28 attached to the rear ends of the side members 14 and the screw 30 of the ball screw actuator engages in a threaded hole of the cross bar 22. The ball screw actuator 26 may be controlled by a switch 32 that is conveniently located on the side of the seat 10.

Figure 2:
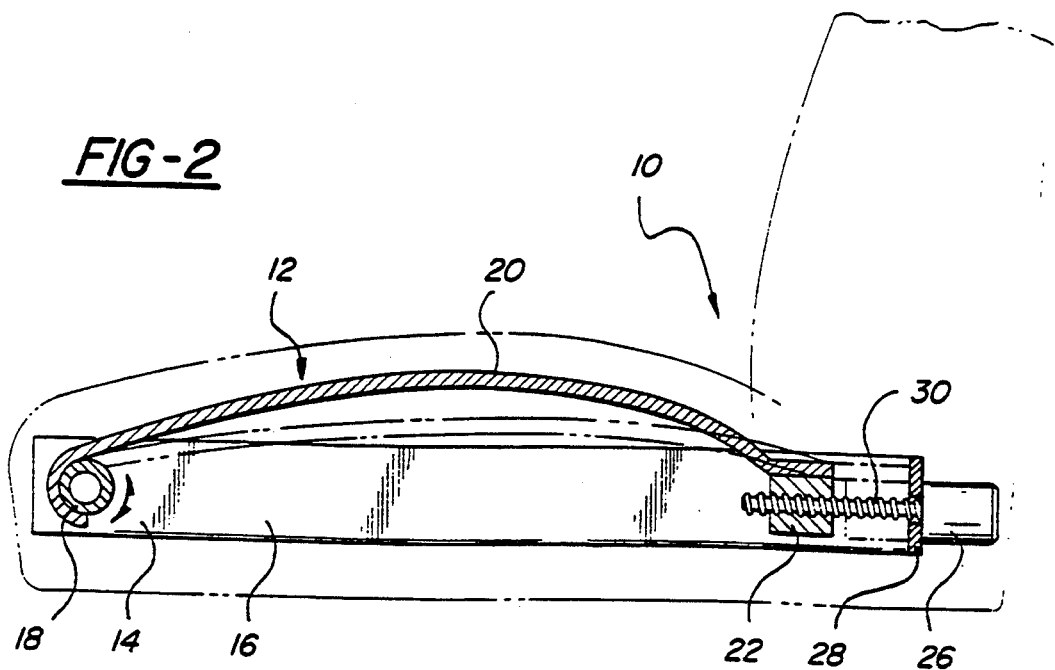
FIG. 2 is a longitudinal section of the vehicle seat that is shown in FIG. 1.

The height adjustment mechanism 12 is covered by the conventional padding and covering of the seat 10 which is indicated in phantom lines in FIGS. 1 and 2.

The height of the seat 10 is adjusted by adjusting the curvature of the bow shaped leaf springs 22 which is accomplished by controlling the ball screw actuator 26 to translate the rear cross bar 22 in the longitudinal direction. A medium height adjustment is shown in solid line in FIGS. 1 and 2. To lower the height of the seat, the rear cross bar 22 is retracted by the ball screw actuator 26 to the right to the phantom line position shown in FIG. 2. This flattens the bow shaped leaf springs 20 as shown in phantom in FIG. 2 and lowers the height of the seating surface. To raise the height of the seat, the rear cross bar 22 is translated to the left as shown in FIG. 2 by extending the ball screw actuator 26. This increases the curvature of the bow shaped leaf springs 20 and consequently the height of the seating surface of the seat 10.

While the height adjustment mechanism 12 described above for purposes of illustration utilizes a single ball screw actuator, the use of a plurality of ball screw actuators is also contemplated. In other words, the invention has been described in an illustrative manner, and it is to be understood that the terminology which has been used is intended to be in the nature of words of description rather than of limitation.

Obviously, numerous modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. An adjustable automotive vehicle seat equipped with a height adjust mechanism comprising:

a frame having spaced members that are fixed with respect to the vehicle seat and cross members spaced along the longitudinal direction of the seat and attached to the spaced members so that one of the cross members moves along the longitudinal direction with respect to the other, a resilient reshapable support member that is fixedly secured to the spaced cross members for concurrent movement with the one cross member and an actuator for moving the one cross member with respect to the other, the actuator having a moveable member that is operatively associated with the one cross member, the height of the seat being adjusted by adjusting the shape of the support member which is accompanied by controlling the actuator to move the one cross member with respect to the other.

2. The adjustable automotive vehicle seat as defined in claim 1 wherein the other cross member is fixed with respect to the spaced members in the longitudinal direction and the one cross member slides in tracks of the spaced members.

3. The adjustable automotive vehicle seat as defined in claim 2 wherein the other cross member is rotatably mounted with respect to the spaced members.

4. An adjustable automotive vehicle seat equipped with a height adjust mechanism comprising:

a frame having laterally spaced side members that are fixed with respect to the vehicle seat, cross members spaced from one another along the longitudinal direction of the frame and attached to the side members so that one of the cross members translates with respect to the other along the longitudinal direction, a resilient reshapable support member that is secured to the longitudinally spaced cross members, and an actuator for translating the one cross member with respect to the other along the longitudinal direction, the actuator having a moveable member that is operatively associated with the one cross member the height of the seat being adjusted by adjusting the shape of the support member which is accompanied by controlling the actuator to translate the one cross member with respect to the other in the longitudinal direction.

5. The adjustable automotive vehicle seat as defined in claim 4 wherein the other cross member is fixed with respect to the side members in the longitudinal direction and the one cross member slides in tracks of the side members.

6. The adjustable automotive vehicle seat as defined in claim 5 wherein the other cross member is rotatably mounted with respect to the side members.

* * * * *